(12) United States Patent
Zhou et al.

(10) Patent No.: US 8,214,001 B2
(45) Date of Patent: Jul. 3, 2012

(54) PORTABLE COMMUNICATION DEVICE WITH ROTATING DISPLAY

(75) Inventors: Xin-Quan Zhou, Shenzhen (CN); Hsiao-Hua Tu, Taipei Hsien (TW); Ye Liu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 342 days.

(21) Appl. No.: 12/549,188

(22) Filed: Aug. 27, 2009

(65) Prior Publication Data

US 2010/0167789 A1 Jul. 1, 2010

(30) Foreign Application Priority Data

Dec. 26, 2008 (CN) .......................... 2008 1 0306590

(51) Int. Cl.
*H04M 1/00* (2006.01)

(52) U.S. Cl. .................. 455/575.1; 455/566; 455/550.1; 455/575.4; 455/575.3

(58) Field of Classification Search ............... 455/550.1, 455/575.1, 575.3, 575.4
See application file for complete search history.

(56) References Cited

U.S. PATENT DOCUMENTS 5,363,089 A * 11/1994 Goldenberg ................. 340/7.63
* cited by examiner

*Primary Examiner* — Fayyaz Alam
(74) *Attorney, Agent, or Firm* — Altis Law Group, Inc.

(57) ABSTRACT

A portable communication device includes a housing body and a display. The housing body includes a hinge portion at one side. A block is formed at each side of the hinge portion. A display forms two knuckles at the other end. Each knuckle forms a plurality of teeth portions, and the hinge portion rotatably connects to the two knuckles. The blocks engage with the teeth portions allowing the display to hold any of a variety of selectable positions relative to the housing body.

2 Claims, 9 Drawing Sheets

PORTABLE COMMUNICATION DEVICE WITH ROTATING DISPLAY

BACKGROUND

1. Technical Field

The present disclosure relates to portable communication devices (e.g., mobile phones), and more particularly to a portable communication device with a rotating display.

2. Description of Related Art

A conventional mobile phone includes a phone body and a cover. The phone body and the cover are rotatably connected together via a hinge. The cover includes a display facing the phone body. During functioning of the phone, alphabet, numbers, and images are shown on the display when a user opens the cover from the phone body by pivoting. However, since the mobile phone can only be opened to preset angles, the display cannot realize wider angle adjustment relative to the phone body.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present portable communication device. Moreover, in the drawings, like reference numerals designate corresponding parts throughout the several views, in which.

DETAILED DESCRIPTION

Figure 1:
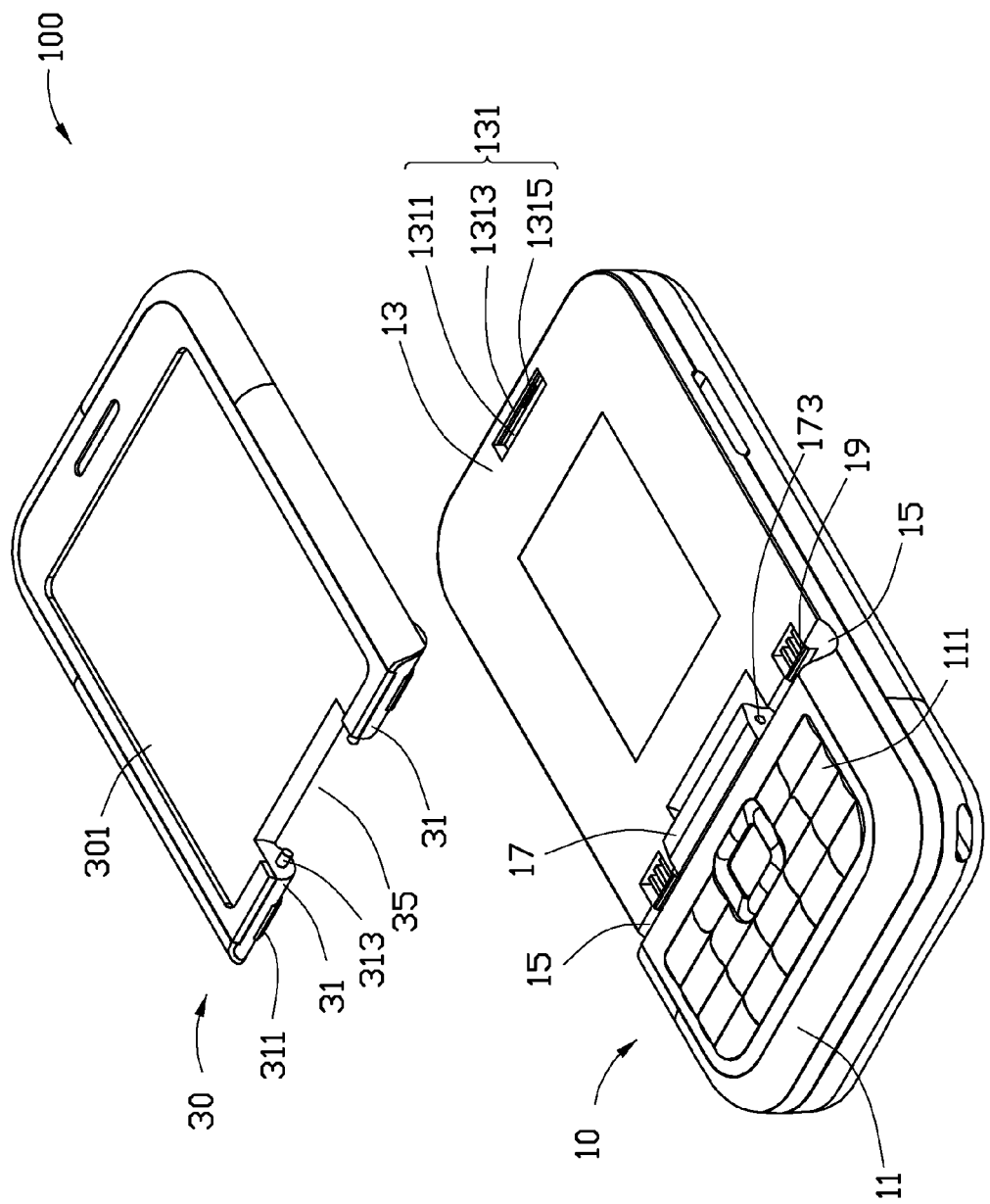
FIG. 1 is an exploded, isometric view of an exemplary mobile phone.
Figure 2:
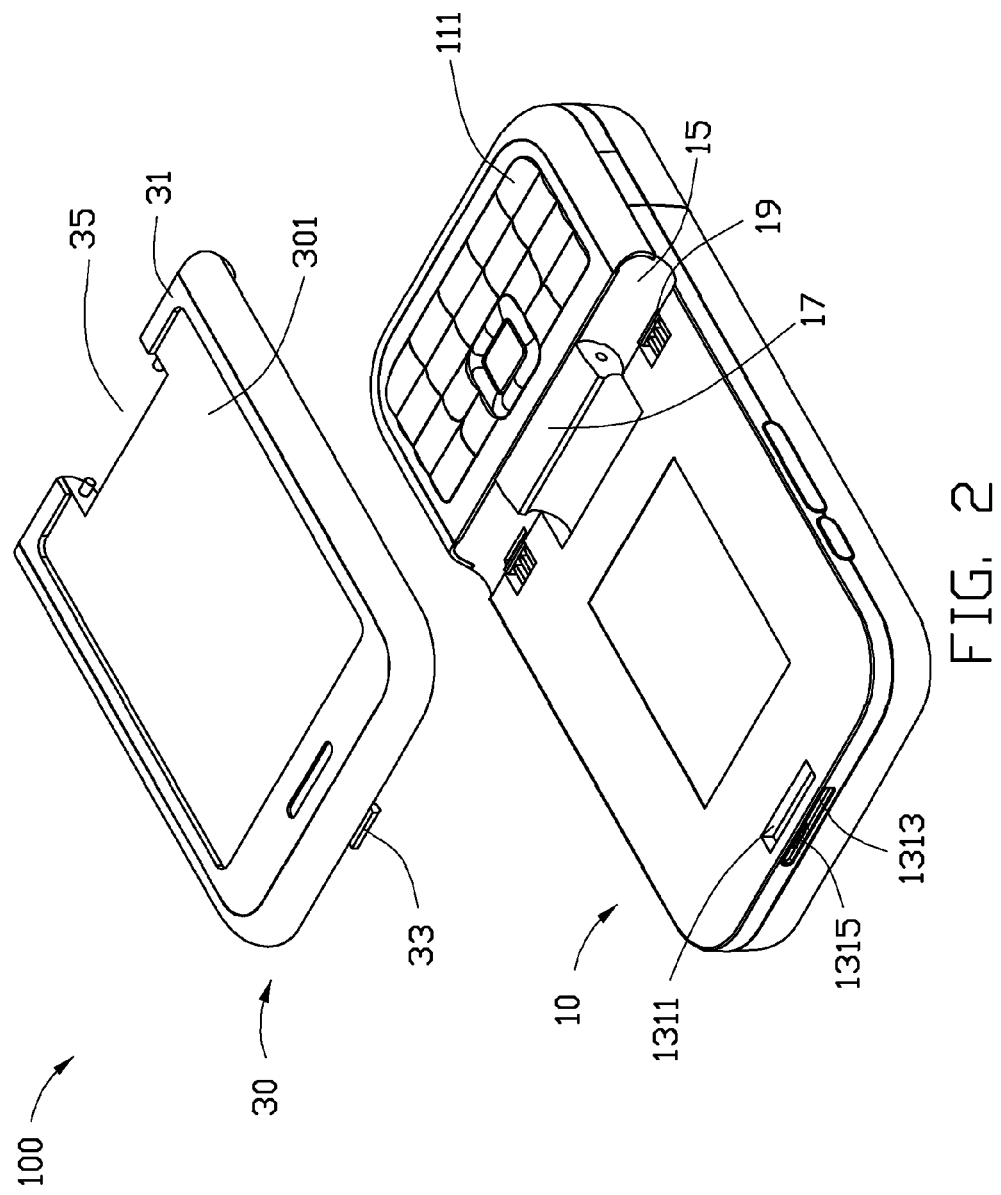
FIG. 2 is similar to FIG. 1, but viewed from another aspect.

Referring to FIGS. 1 and 2, a portable communication device 100 includes a housing body 10 and a display 30. The display 30 is rotatably connected to the housing body 10. The display 30 includes a screen 301. During functioning, alphabet, numbers, and images are shown on the screen 301 when a user opens the display 30 from the housing body 10 by pivoting.

Figure 3:
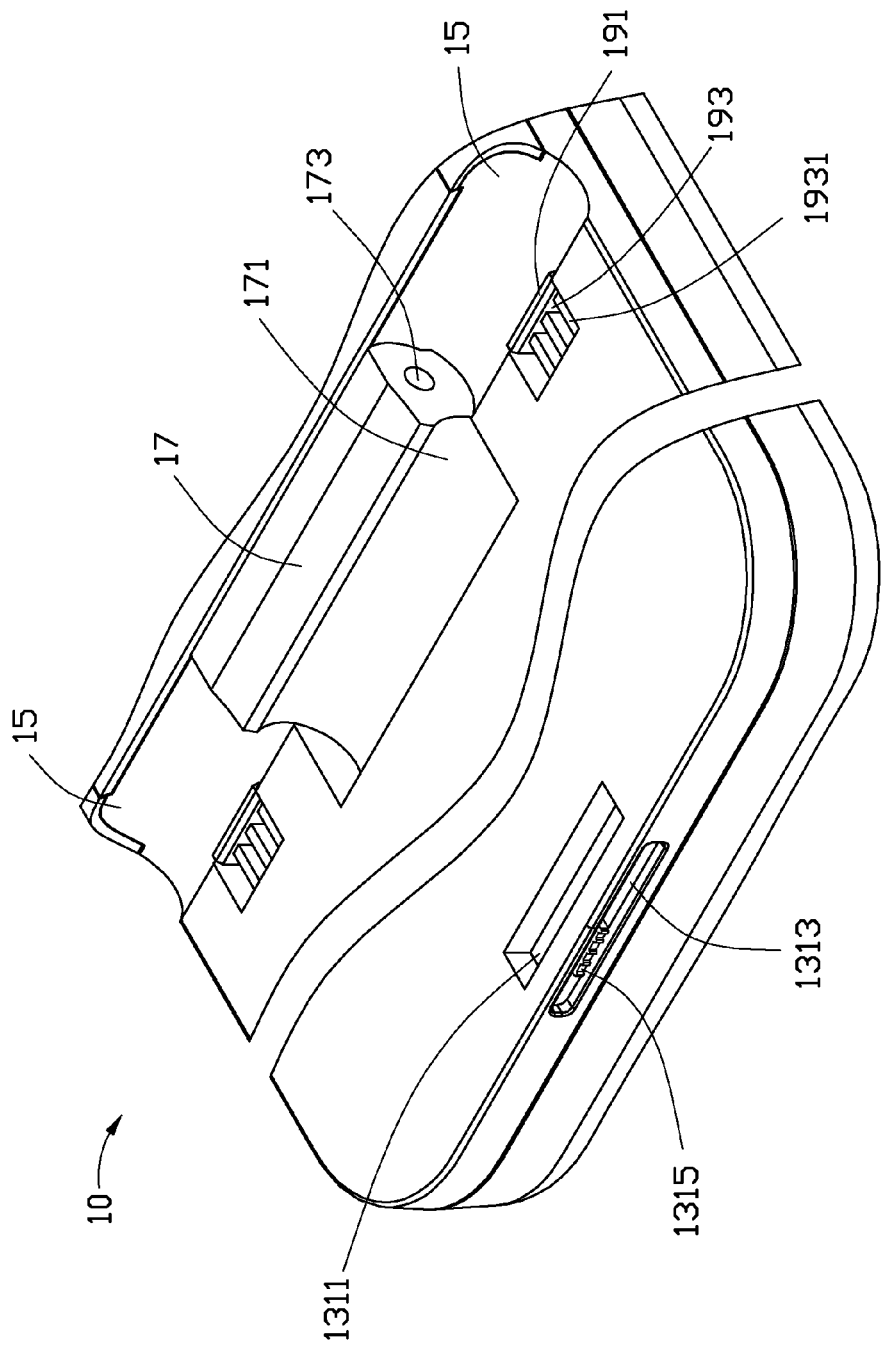
FIG. 3 is an enlarged view of the phone body shown in FIG. 1.

Referring to FIG. 3, the housing body 10 includes a first portion 11 and a second portion 13 adjacent to the first portion 11. The first portion 11 forms a plurality of keys 111 for operating the portable communication device 100. One side of the first portion 11 includes an arcuate groove 15 and a hinge portion 17 adjacent to the keys 111. The hinge portion 17 is received in the arcuate groove 15. A through hole 173 is longitudinally defined in the hinge portion 17. One side of the hinge portion 17 is recessed to form an arcuate resisting surface 171 at the second portion 13. The second portion 13 symmetrically forms one stopper portion 19 at each side of the hinge portion 17. Each of the stopper portion 19 defines a receiving groove 193. A plurality of ribs 1931 are formed in the receiving groove 193. A block 191 covers one side of the receiving groove 193. The second portion 13 defines a latching hole 1311 and a slot 1313 at one end far away from the hinge portion 17. The latching hole 131 and the slot 1313 communicate with each other. A slider 1315 is received in the slot 1313. The latching hole 1311, the slot 1313 and the slider 1315 constitutes a latching portion 131 for releasable latching the display 30.

Figure 4:
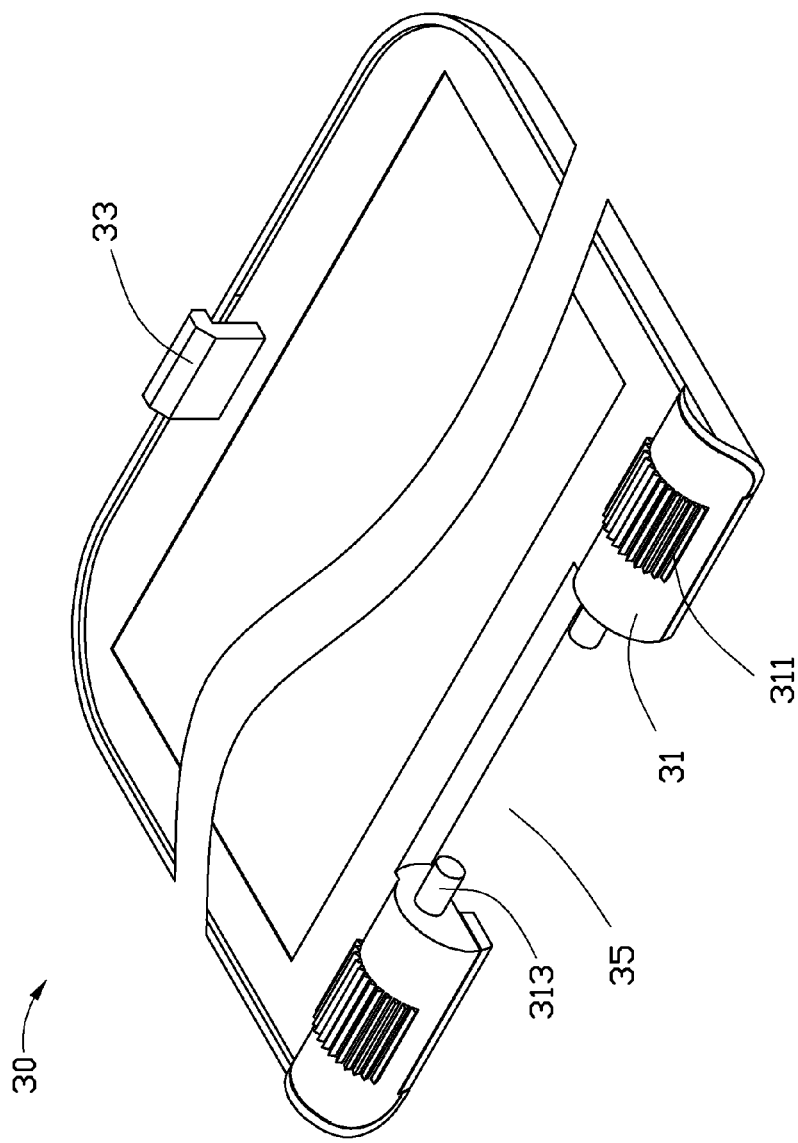
FIG. 4 is an enlarged view of the cover shown in FIG. 1.
Figure 9:
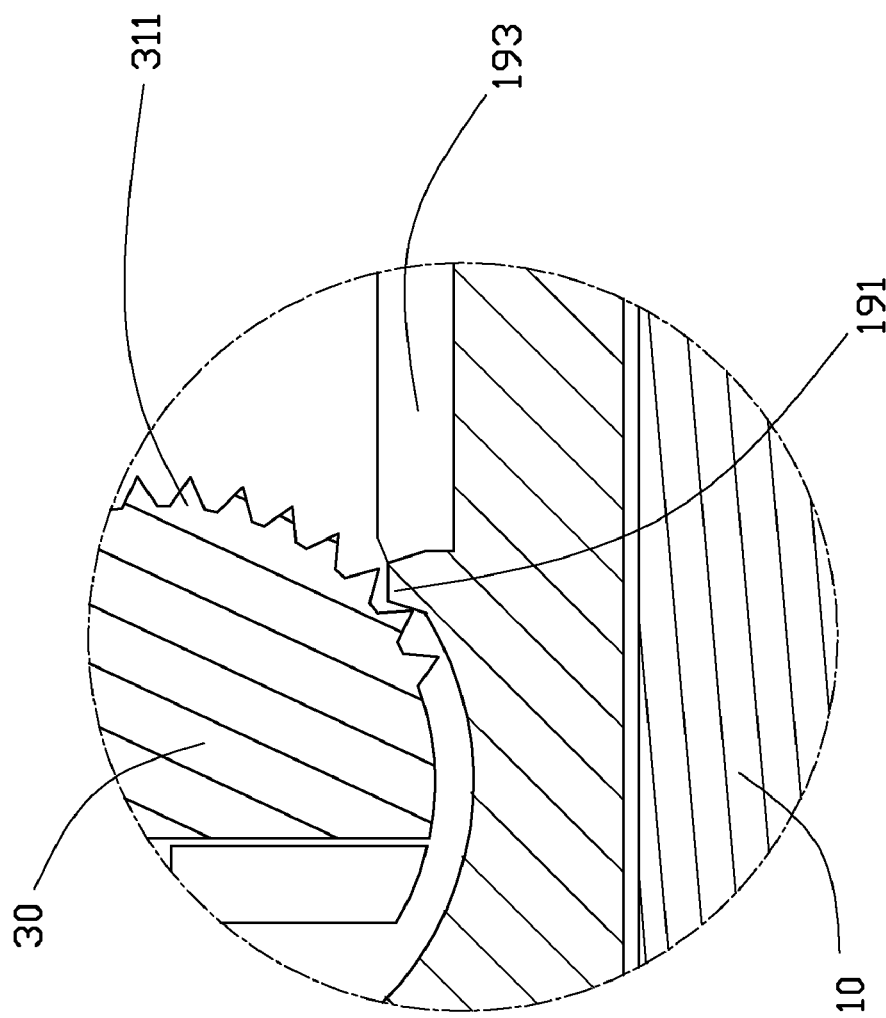
FIG. 9 is a partially enlarged view of FIG. 8.

Referring to FIG. 4, one end of the display 30 symmetrically forms two knuckles 31, the other end thereof forms a clasp 33. The knuckles 31 accommodate in the arcuate groove 15. An opening 35 is defined between the knuckles 31. Each knuckle 31 forms a plurality of teeth portions 311 equally spaced along a peripheral wall of the knuckle 31. Referring to FIG. 9, each tooth portion 311 has a triangle-shaped outline, which is configure (i.e., structured and arranged) for engaging with the block 191. A space between each tooth portion 62 allows the block 191 to be driven when the display 30 rotates. A post 313 longitudinally extends from a side of each knuckle 31. The posts 313 are rotatably received in the through hole 173. The clasp 33 may be inserted into the latching hole 1311, and is latched by the slider 1315.

Figure 5:
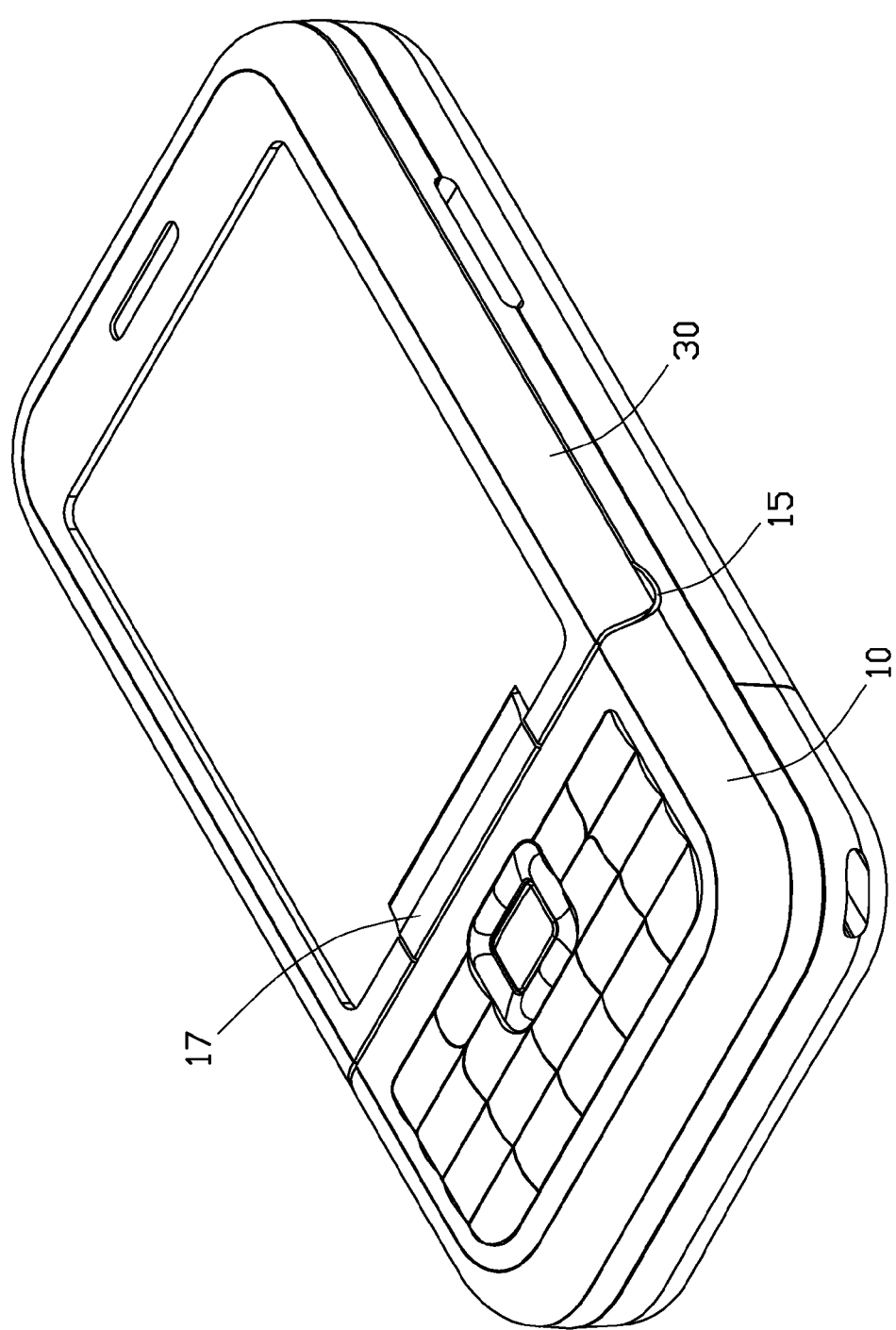
FIG. 5 is an assembled, isometric view of the exemplary mobile phone shown in FIG. 1.
Figure 6:
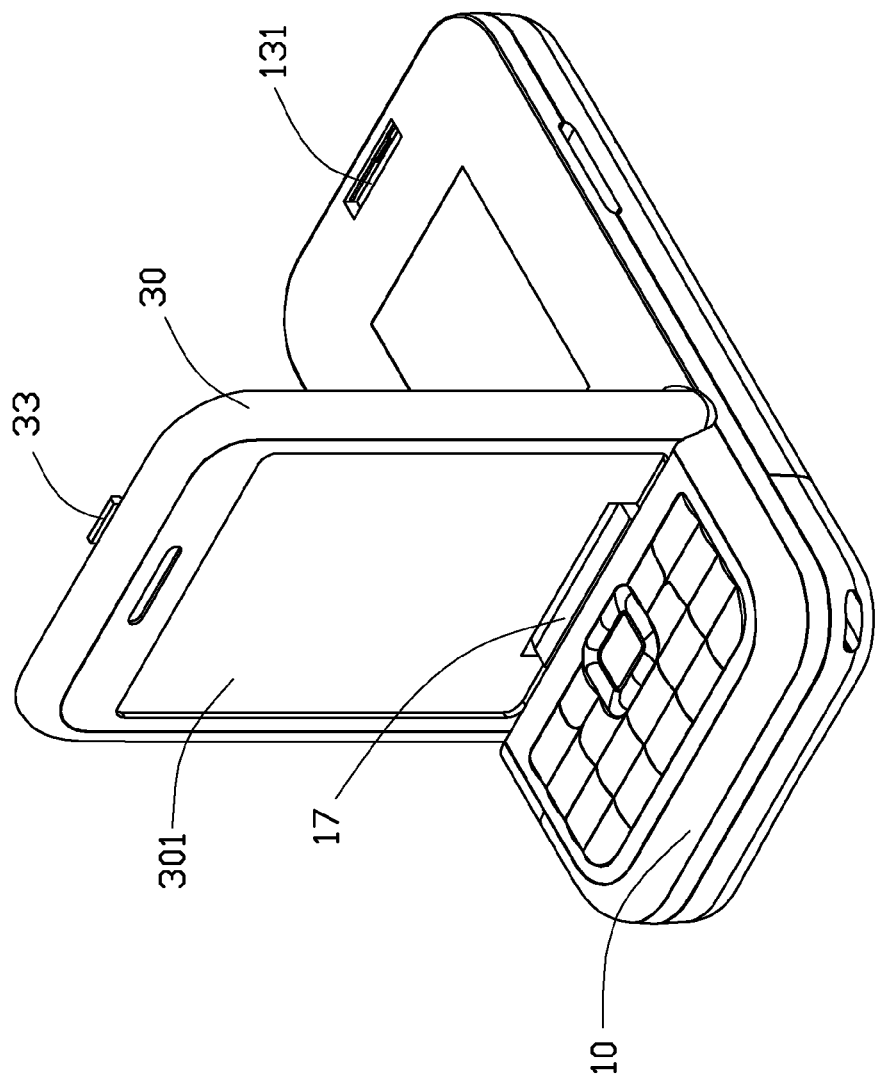
FIG. 6 is an open state view of the mobile phone shown in FIG. 5.
Figure 7:
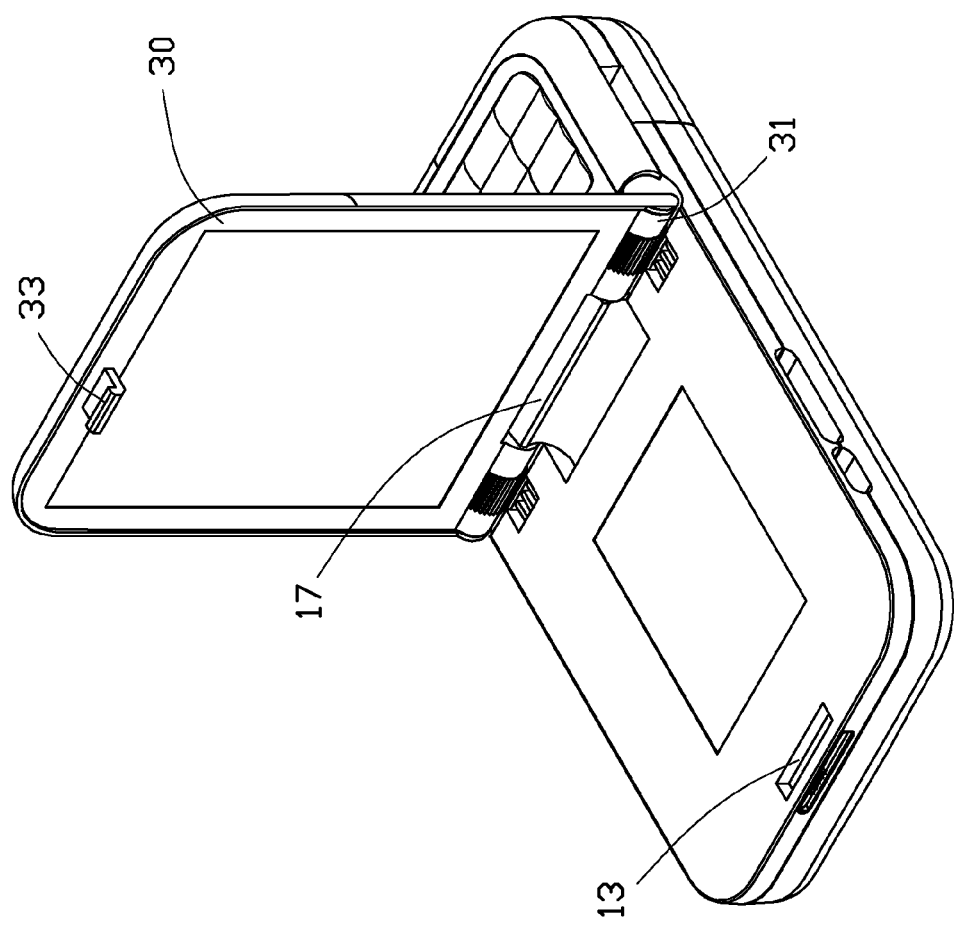
FIG. 7 is similar to FIG. 6, but viewed from another aspect.
Figure 8:
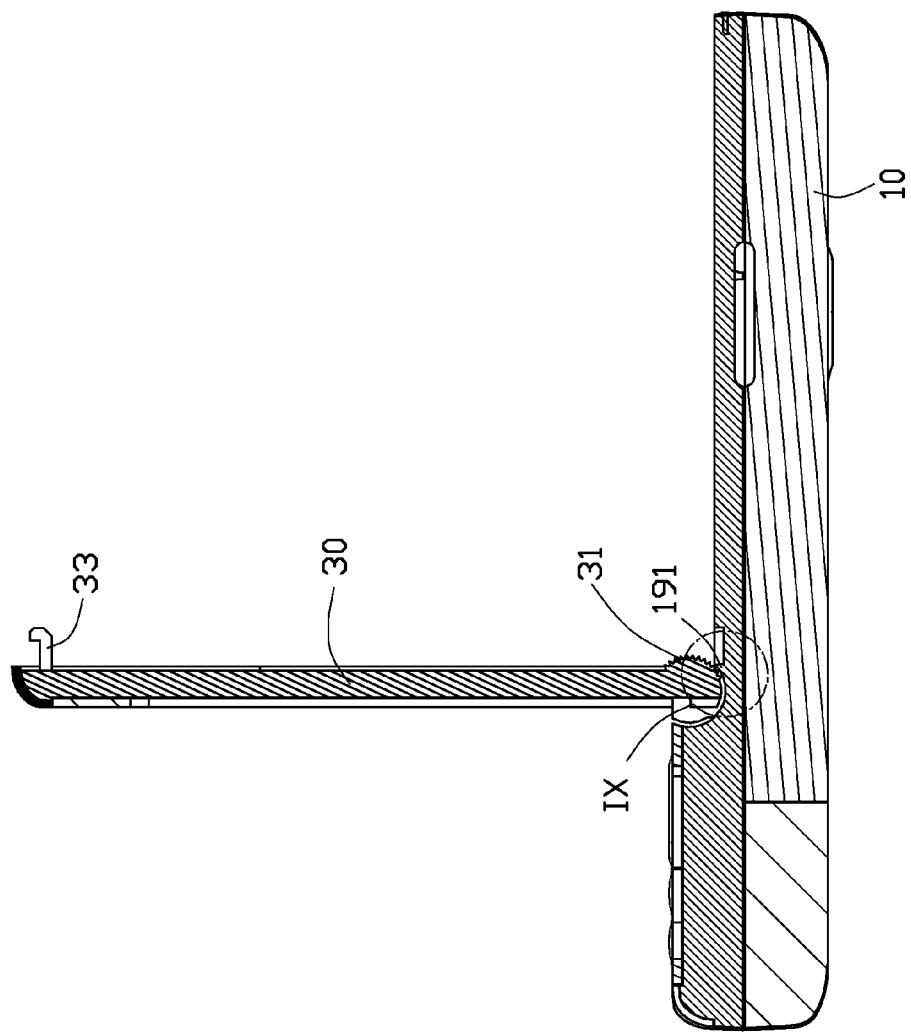
FIG. 8 is a cross sectional view of FIG. 7.

Referring to FIG. 5, when the display 30 is assembled to the housing body 10, the knuckles 31 of the display 30 are received in the arcuate groove 15, and the hinge portion 17 is positioned in the opening 35. The posts 313 are received in the through hole 173 of the hinge portion 17. The block 191 of each stopper portion 19 is positioned between two teeth portions 311. The display 30 is rotated relative to the housing body 10 about the hinge portion 17 until the display 30 is closed relative to the housing body 10. The clasp 33 is received in the latching hole 1311. The slider 1315 is forced to slide for latching the clasp 33.

Referring to FIGS. 6-9, when the user wants to open the display 30 of the portable communication device 100, the slider 1315 is pushed to slide to separate from the clasp 33 so as to unlocked the display 30. The display 30 is manually rotated relative to the housing body 10, and the teeth portions 311 are also rotated. The blocks 191 are engaged in the teeth portions 311. Under no role of external forces, the display 301 can be held in a steady state in a variety of selectable positions. Accordingly, the display 30 becomes open relative to the housing body 10 of the portable communication device 100.

Understandably, the stopper portion may be replaced with a conical spring. One end of the conical spring is fixed in the housing body 10, and the other end of the conical spring engages with the teeth portion.

It is believed that the present embodiments and their advantages will be understood from the foregoing description, and it will be apparent that different changes may be made thereto without departing from the spirit and scope of the invention or sacrificing all of its material advantages, the examples hereinbefore described merely being preferred or exemplary embodiments of the invention.

What is claimed is:

1. A portable communication device comprising:

a housing body including a first portion and a second portion, a plurality of keys formed on the first portion, a hinge portion positioned between the first portion and the second portion and adjacent to the keys; two blocks respectively being formed at two sides of the hinge portion;

a display forming two knuckles at the other end; each knuckle forming a plurality of teeth portions, the hinge portion rotatably connecting to the two knuckles and positioning the display lying on the second portion of the housing body adjacent to the keys, and the blocks engaging with the teeth portions allowing the display to hold any of a variety of selectable positions relative to the housing body;

wherein the housing body defines an arcuate groove between the first portion and the second portion, an opening is defined between the knuckles, the hinge portion is formed in the arcuate groove and received in the opening, and the knuckles are received in the arcuate groove;

wherein each side of the hinge portion forms a stopper portion, the stopper portion defines a receiving groove, a plurality of ribs are formed in the receiving groove, and the block covers one side of the receiving groove.

2. A portable communication device comprising:

a housing body including a first portion and a second portion, a hinge portion positioned between the first portion and the second portion, and two stopper portions being formed at two sides of the hinge portion;

a display forming two knuckles at the other end; each knuckle forming a plurality of teeth portions, the hinge portion rotatably connecting to the two knuckles and positioning the display lying on the second portion of the housing body, and the stopper portions engaging with the teeth portions allowing the display to hold any of a variety of selectable positions relative to the housing body;

wherein the housing body defines an arcuate groove between the first portion and the second portion, an opening is defined between the knuckles, the hinge portion is formed in the arcuate groove and received in the opening, and the knuckles are received in the arcuate groove;

wherein the hinge portion defines a through hole, a post extends from each knuckle, and the posts are rotatable received in the through hole to co-axially connect the hinge portion and the knuckles.

\* \* \* \* \*